US008070610B2

(12) United States Patent
Vetter et al.

(10) Patent No.: US 8,070,610 B2
(45) Date of Patent: Dec. 6, 2011

(54) REPOSITIONABLE HANDLE ASSEMBLIES FOR DROP-IN-BAR GAMING MACHINES

(75) Inventors: Kay Vetter, Reno, NV (US); Randy Hedrick, Reno, NV (US); John Leagh Beadell, Sparks, NV (US)

(73) Assignee: IGT, Reno, NV (US)

(*) Notice: Subject to any disclaimer, the term of this patent is extended or adjusted under 35 U.S.C. 154(b) by 0 days.

(21) Appl. No.: 13/041,499

(22) Filed: Mar. 7, 2011

(65) Prior Publication Data

US 2011/0177868 A1 Jul. 21, 2011

(51) Int. Cl.
*A63F 13/08* (2006.01)
*G07F 17/34* (2006.01)

(52) U.S. Cl. ...... 463/46; 463/20; 273/143 R; 273/138.1; 273/138.2; 273/309

(58) Field of Classification Search .............. 273/143 R, 273/138.2, 138.1, 309; 463/46, 20
See application file for complete search history.

(56) References Cited

U.S. PATENT DOCUMENTS

| | | | | |
|---|---|---|---|---|
| 4,400,763 | A * | 8/1983 | Kribs et al. | 362/103 |
| 4,813,675 | A | 3/1989 | Greenwood | |
| 5,676,231 | A | 10/1997 | Legras et al. | |
| 6,857,804 | B2 | 2/2005 | Luciano, Jr. et al. | |
| 6,860,814 | B2 * | 3/2005 | Cole | 463/46 |
| 6,997,810 | B2 | 2/2006 | Cole | |
| 7,267,613 | B2 * | 9/2007 | Cole | 463/20 |
| 7,889,907 | B2 * | 2/2011 | Engelbart et al. | 382/141 |
| 2004/0002389 | A1 * | 1/2004 | Sartini | 463/46 |
| 2004/0061284 | A1 * | 4/2004 | Satoh | 273/138.1 |
| 2005/0001124 | A1 * | 1/2005 | Litke et al. | 248/305 |
| 2005/0277477 | A1 * | 12/2005 | Hajder et al. | 463/46 |
| 2008/0051202 | A1 | 2/2008 | Lube | |
| 2009/0124396 | A1 | 5/2009 | Vetter et al. | |

OTHER PUBLICATIONS

Restrictions Requirement mailed Aug. 18, 2010, from U.S. Appl. No. 12/267,432.
Office Action mailed Nov. 19, 2010, from U.S. Appl. No. 12/267,432.

* cited by examiner

*Primary Examiner* — Benjamin Layno
(74) *Attorney, Agent, or Firm* — Weaver Austin Villeneuve & Sampson LLP

(57) ABSTRACT

A "drop-in" style bar top gaming machine that includes a support frame having at least two opposed support walls, and a top panel assembly supporting a display device. The top panel assembly is further configured to cooperate with the support frame for movement between a closed position and an open position, enabling access to the support frame. An illumination assembly is provided for interior illumination of the gaming machine.

20 Claims, 14 Drawing Sheets

REPOSITIONABLE HANDLE ASSEMBLIES FOR DROP-IN-BAR GAMING MACHINES

CROSS-REFERENCE TO RELATED APPLICATIONS

This application claims priority under 35 U.S.C. §119(e) from U.S. patent application Ser. No. 12/267,432, filed on Nov. 7, 2008, entitled "REPOSITIONABLE HANDLE ASSEMBLIES FOR DROP-IN-BAR GAMING MACHINES," now U.S. Pat. No. 7,938,728 which claims priority under 35 U.S.C. §119(e) from U.S. Provisional Patent Application No. 60/986,386 and No. 61/002,620, both filed on Nov. 8, 2007, and both entitled "TECHNIQUES FOR FACILITATING INSTALLATION/REMOVAL OF DROP-IN-BAR GAMING MACHINES." All of these applications name Vetter et al. as inventors, and all of these applications are incorporated herein by reference in their entirety for all purposes.

TECHNICAL FIELD

The present invention relates generally to gaming machines such as slot machines and video poker machines, particularly those that are drop-in installed into a bar top, tabletop, or other working surface.

BACKGROUND ART

Casinos are typically crowded environments where difficulties in locating available gaming machines at bars, keno lounges, restaurants, sports book areas, etc are often encountered by patrons. In order to maximize the available floor space of a gaming establishment, gaming operators have resorted to installing gaming machines at a variety of different locations within a casino including, for example, restaurants, bars and/or other more non-conventional locations. For example, it is now quite common now, in gaming jurisdictions, to see bar tops with "drop-in" installed gaming machines mounted directly into them.

Generally, these bar top, or "drop-in" installed gaming machines are compact designs that mount into a specially designed counter top of a restaurant, bar and/or other facility. Typically, such gaming machines are literally "dropped-in" through an opening in the top of the table or bar top, wherein a substantial portion of the gaming machine components/hardware is located within or under the tabletop of the bar cabinet.

Often the opening in the tabletop is sized just slightly larger than the vertical footprint of the gaming machine. Such close tolerances between the gaming machine peripheral footprint and tabletop opening minimizes any gaps therebetween, increasing usable tabletop surface area and/or increasing the density of gaming machines per table or bar top.

Unfortunately, maintenance access to the internals of these "drop-in-bar" machines is difficult due to such tolerance issues, and due to the fact that often, side mounted service door may not be available due to its placement with in the tabletop or bar top. Maintenance access to the internal component, thus, may sometimes only be available through a hinged top panel of the "drop-in-bar" machine, and/or may require complete removal thereof.

Coupled with the conventional practice in the gaming industry of reducing the overall dimensions of the gaming machine frames by eliminating non-essential components of gaming machines (e.g., carrying handles), handling of these relatively heavy and bulky "drop-in-bar" machines is cumbersome at best. As mentioned, these relatively bulky units are literally "dropped-in" through the top opening in the tabletop. Without the addition of unsightly handles upstanding from the face of the gaming machine, handling of these relatively heavy units has proven problematic.

One common installation technique is to lift the machine onto the bar with the top panel open, and have a technician (which is standing on the bar top surface) pick the machine up by the open sides of the top panel, and lower the machine into the cavity. Typically, because the gaming machine has no additional space to accommodate handles, the top panel is often used as a handle. These top panels, of course, were not designed to be used as such, and can sometimes be damaged.

Accordingly, it is desirable to improve the handling and installation of these "drop-in" installed gaming machines by providing repositionable handle assemblies that are stout and secure when affixed to the gaming machine, yet can be easily removed with minimal effort.

DISCLOSURE OF INVENTION

The present invention provides a "drop-in" installed bar top gaming machine assembly configured to mount to a tabletop through an opening in a top surface of the tabletop. The gaming machine assembly includes a support frame, having two spaced-apart support walls, which support and house some of the primary gaming machine electronics such as a master gaming controller and memory. A top panel assembly is provided which supports at least a display device therein, and is further configured to cooperate with the support frame for movement between a closed position and an open position, enabling access to the support frame. The gaming machine further includes a pair of repositionable handle assemblies each having a handle member and a mounting portion. Each mounting portion of the respective handle assembly is movably mounted to a corresponding support wall of the support frame between a first position and a second position. In the first position, each handle member is positioned and oriented out of any obstructive orientation with the top panel assembly so that it can be freely moved to the closed condition. In the second position, in contrast, when the top panel assembly is in the open position, the handle member is exposed in a manner that permits gripping thereof to vertically support and lift the gaming machine assembly.

Accordingly, a pair of repositionable handle assemblies are provided that are movably mountable to the gaming machine support frame that, when oriented in the second position, enable or aid a gaming machine technician to vertically lift and support the gaming machine during in drop mounting the gaming machine directly through the opening in the tabletop. Moreover, due to the tight tolerances between the gaming machine and its corresponding drop-in opening in the tabletop, as well as the compact design of the gaming machines themselves, when the handle assemblies are oriented in the first position, they are repositioned out of any obstructive orientation that prevents movement of the top panel. More particularly, the orientation of the handle assemblies will not prevent positioning of the top panel assembly to its first or closed position that is generally flush with the tabletop when the gaming machine is mounted therein.

In one particular embodiment, the mounting portion is configured to slideably cooperate with the corresponding support wall such that in the second position, the respective handle member is oriented above an upper edge of the support wall, and in the first position, the respective handle member is oriented at least flush with or below the upper edge of the support wall.

In this specific embodiment, each the handle member may include a first support post mounted to the handle member. Further, each mounting portion includes a first mounting guide mounted to the support wall. The mounting guide defines a receiving slot that is formed and dimensioned for sliding receipt of the first post therethrough for movement of the first support post between the second position and the first position.

In still another specific configuration, each the handle member further includes a second support post mounted to the handle member, with the second support post being spaced apart from the first support post. Each mounting portion further includes a second mounting guide mounted to the support wall. These second mounting guides define a respective receiving slot that are formed and dimensioned for sliding receipt of the second post therethrough for movement of the second support post between the first position and the second position. Each mounting portion, in yet another embodiment, is configured to removably mount to the respective support wall.

In another embodiment, each handle assembly includes a base portion coupled to the corresponding handle member. Each mounting portion further includes at least one, and preferably two, knob devices having a head portion and a neck portion mounted to either the base portion or the corresponding support wall. The thinner neck portion has a smaller transverse cross-sectional dimension than that of the head portion. Each mounting portion includes a corresponding keyhole slot formed in the other of the support wall or the base portion. Each keyhole slot includes a first portion and a joined second portion, the first portion being dimensioned for sliding receipt of the knob device head portion transversely therethrough. The second portion of the keyhole slot having a width dimensioned for sliding receipt of the neck portion longitudinally therethrough, although having a width dimension less than that of the head portion. In the first position of the handle assemblies, each neck portion of the mounting portion is slideably received in the second portion of the corresponding keyhole slot.

In one specific configuration, each first knob device is mounted to the base portion, while each the keyhole slot is defined by the corresponding support wall. Further, the longitudinal length of the neck portion is slightly longer than the thickness of the support wall.

Yet another embodiment provides a lock assembly for each mounting portion that is configured to releasably lock the corresponding handle assembly to corresponding support wall, in the first position. Each lock assembly, in one specific embodiment includes a locking pin moveably mounted to a corresponding base portion between a retracted condition and an extended condition. In the extended condition, the locking pin extends away from the base portion for receipt in a corresponding pin aperture in the corresponding support wall, the aperture of which is sized and dimensioned for sliding receipt of the locking pin in the first position, to lock the handle assembly.

Still another specific embodiment yields a lock assembly that includes a biasing device that cooperates with the locking pin to bias the same toward the extended condition. Preferably, each lock assembly includes a biasing device that cooperates with the locking pin to bias the locking pin toward the extended condition.

In one specific embodiment, the biasing device includes a spring member cooperating between the locking pin and the support wall to bias the locking pin toward the extended condition.

In yet another configuration, each locking pin is adapted for threaded receipt in the corresponding pin aperture.

In another specific aspect of the present invention, a support housing is provided for a "drop-in" style bar top gaming machine that configured for "drop-in" installation through an opening in a top surface of a tabletop. The gaming machine, briefly, includes at least a master game controller, memory, a display and a top panel assembly supporting the display device. The top panel assembly is configured to cooperate with the support housing for movement thereof between a closed position and an open position, enabling access to the support housing. The support housing of the present invention includes a support frame having at least two opposed support walls, and a pair of repositionable handle assemblies. Each handle assembly is movably mounted to the support frame between a first position and a second position, and includes a handle member and a respective mounting portion. In the first position of the handle assembly, each respective handle member is repositioned out of any obstructive orientation in order to permit the top panel assembly to be placed in the closed position. In the second position of the handle assembly, the respective handle member is exposed in a manner that permits gripping thereof to vertically support and lift the gaming machine assembly during "drop-in" installation through the opening in the tabletop when the top panel assembly is in the open position.

In yet another aspect of the present invention, a gaming machine assembly is provided having a master gaming controller, memory and a support frame. The gaming machine further includes an illumination assembly having a shield device and a lamp supported by the shield device. A docking assembly is included that is coupled to the support frame for support thereof. The docking assembly defines an interior cavity formed of receipt of the shield device between a docking condition, secured in the interior cavity during nonuse, and a use condition, permitting movable operable use of the illumination assembly.

In one specific embodiment, the shield device includes a gripping region formed for manual manipulation thereof.

In another configuration, the gaming machine assembly further includes a locking assembly cooperating with the illumination assembly and the docking assembly for movement between the lock condition and a release condition. In the lock condition, the illumination assembly is releasably locked to the docking assembly, in the docking condition. In the release condition, illumination assembly is disengaged, to permit movement thereof toward the use condition.

In still another specific arrangement, the docking assembly includes a docking frame defining the interior cavity; and the locking assembly includes a locking pin having a distal tip portion moveably mounted to the docking frame between the lock condition and the release condition. In the lock condition, the tip portion extends into a pin slot defined in the shield device, and is formed for sliding receipt of the pin tip portion to retain the illumination assembly in the docked condition. In the release condition, the tip portion is disengaged from the pin slot to release the illumination assembly from the docked condition.

Another embodiment of the locking assembly includes a biasing device that biases the locking pin toward the lock condition.

BRIEF DESCRIPTION OF THE DRAWING

The assembly of the present invention has other objects and features of advantage which will be more readily apparent from the following description of the best mode of carrying out the invention and the appended claims, when taken in conjunction with the accompanying drawing, in which:

BEST MODE OF CARRYING OUT THE INVENTION

Figure 1:
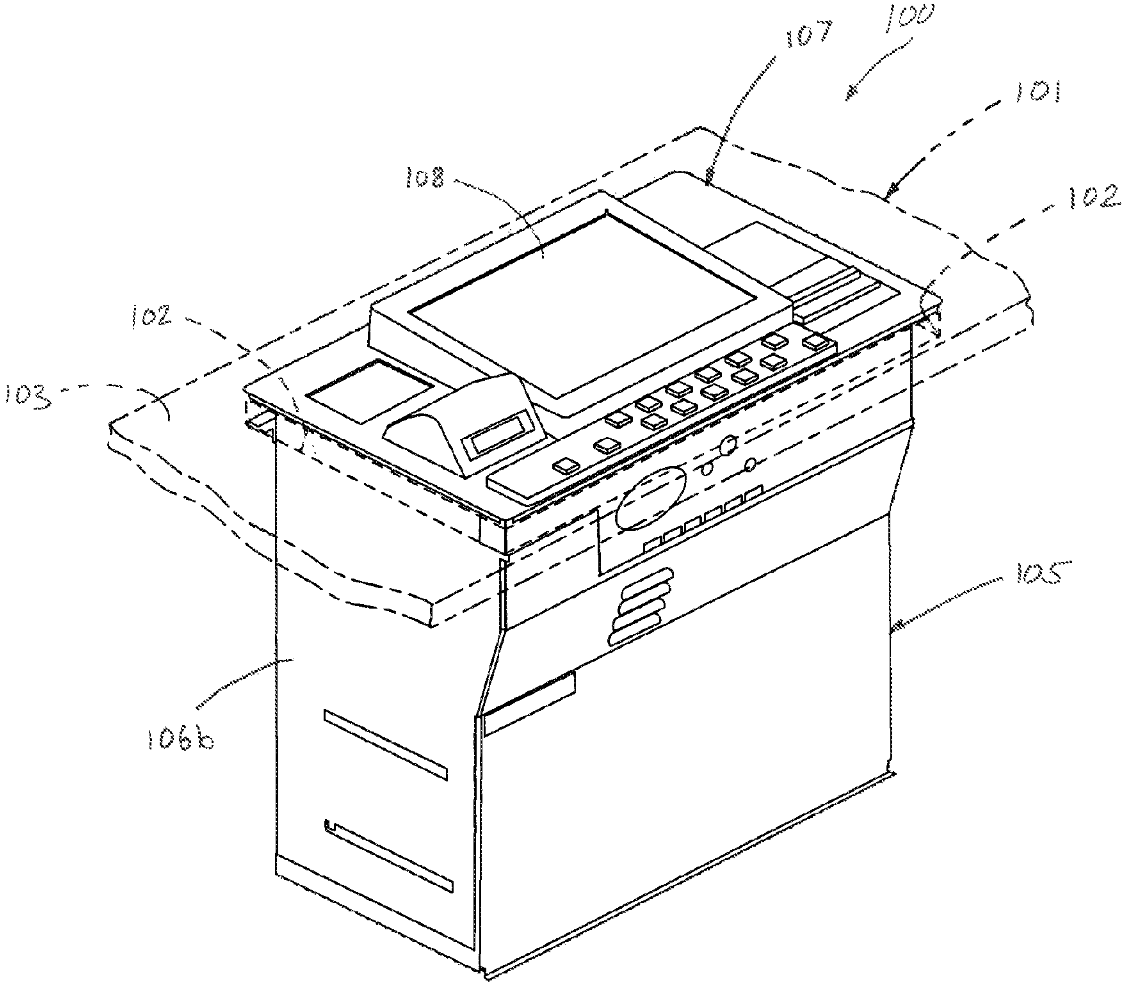
FIG. 1 is a top perspective view of a "drop-in" installed tabletop style gaming machine mounted to a tabletop.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

A description of an embodiment with several components in communication with each other does not imply that all such components are required. To the contrary, a variety of optional components are described to illustrate the wide variety of possible embodiments of one or more of the invention(s).

Further, although process steps and method steps or the like may be described in a sequential order, such processes, methods may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features.

Thus, other embodiments of one or more of the invention(s) need not include the device itself.

Turning now to FIGS. 1-4, a "drop-in" style bar top gaming machine assembly, generally designated 100, is provided that is configured to mount to a tabletop 101 through an opening (represented by broken lines 102) in a top surface 103 of the tabletop. The gaming machine assembly 100 includes a support frame 105, having two spaced-apart support walls 106*a*, 106*b*, which support and house some of the primary gaming machine electronics such as a master gaming controller and memory. A top panel assembly 107 is provided which supports at least a display device 108 therein, and is further configured to cooperate with the support frame 105 for movement between a closed position (FIG. 1) and an open position (FIG. 2), enabling access to the electronic components housed in the support frame 105. The gaming machine assembly 100 further includes a pair of repositionable handle assemblies 110*a* and 110*b*, each having a handle member 111*a*, 111*b* and a corresponding mounting portion 112*a*, 112*b*. Each mounting portion 112*a*, 112*b* of the respective handle assembly 110*a*, 110*b* is movably mounted to a corresponding support wall 106*a*, 106*b* of the support frame 105 between a first position (FIGS. 1, 9A and 12A) and a second position (FIGS. 2, 5, 6, 9B and 12B).

In the first position, each handle member 111*a*, 111*b*, is positioned and oriented out of obstructive orientation such that the top panel assembly 107 is permitted to reposition in the closed condition. In general, in the second position, the handle assemblies will be entirely detached or positioned such that the corresponding handle members 111*a*, 111*b* are below the upper edge 113*a*, 113*b* of the corresponding support walls 106*a*, 106*b*. In the second position, in contrast, when the top panel assembly 107 is in the open position (FIG. 2), each handle member 111*a*, 111*b* is exposed in a manner that permits gripping thereof. Such an orientation allows vertical lifting and support of the gaming machine for installation, repair and removal thereof.

Accordingly, various aspects are described to facilitate the installation and/or removal of the "drop-in-bar" gaming machines into bars, tables, and/or other table-top structures. For instance, a pair of handle assemblies are provided that are movably mountable to the gaming machine support frame that, when oriented in the second position, enable or aid a gaming machine technician to vertically lift and support the gaming machine during in drop mounting the gaming machine directly through the opening in the tabletop. Moreover, due to the tight tolerances between the gaming machine and its corresponding drop-in opening in the tabletop, as well as the compact design of the gaming machines themselves, when the handle assemblies are oriented in the first position, they are moved out of any obstructive orientation that prevents movement of the top panel. More particularly, the orientation of the handle assemblies will not prevent positioning of the top panel assembly to the closed position that is generally flush with the tabletop when the gaming machine is mounted therein.

In at least one embodiment, the gaming machine housing or frame 105 may be modified such that these repositionable handle assemblies 110*a*, 110*b*, can be removably mounted to gaming machine frame 105 in the second position (e.g., the embodiments of FIGS. 1 and 9A), to aid in manual handling of the gaming machine. When such manual manipulation is completed, the handle assemblies can be moved toward the first position (FIGS. 2, 5, 6 and 9B), where the handles can be completely removed or detached from the corresponding support walls 106*a*, 106*b*. One additional benefit of this arrangement is that the same handle assemblies can be used with any gaming machine that incorporated the same or similar mounting portion 112*a*, 112*b*.

In yet another embodiment, the repositionable handle assemblies 110*a*, 110*b*, can be movably mounted to the frame such that they can be moved or repositioned, from the second position to the first position, without being removed or detached from the frame. For example, as shown in embodiment of FIGS. 12A and 12B, the handle assembly 110 is mounted to the corresponding support wall 106 for sliding movement between the second position (FIG. 12B), exposing the handle member 111 to gripping contact above the support wall 106, and the first position (FIG. 12A), slideably positioning the handle member downwardly vertically below the support wall 106 so as to be clear of any obstruction to the top panel assembly 107. In this specific arrangement, the housing frame 105 may be modified to include one or more permanently affixed handle assemblies 110*a*, 110*b* that are capable of sliding or rotating out of any obstructive orientation.

Figure 3:
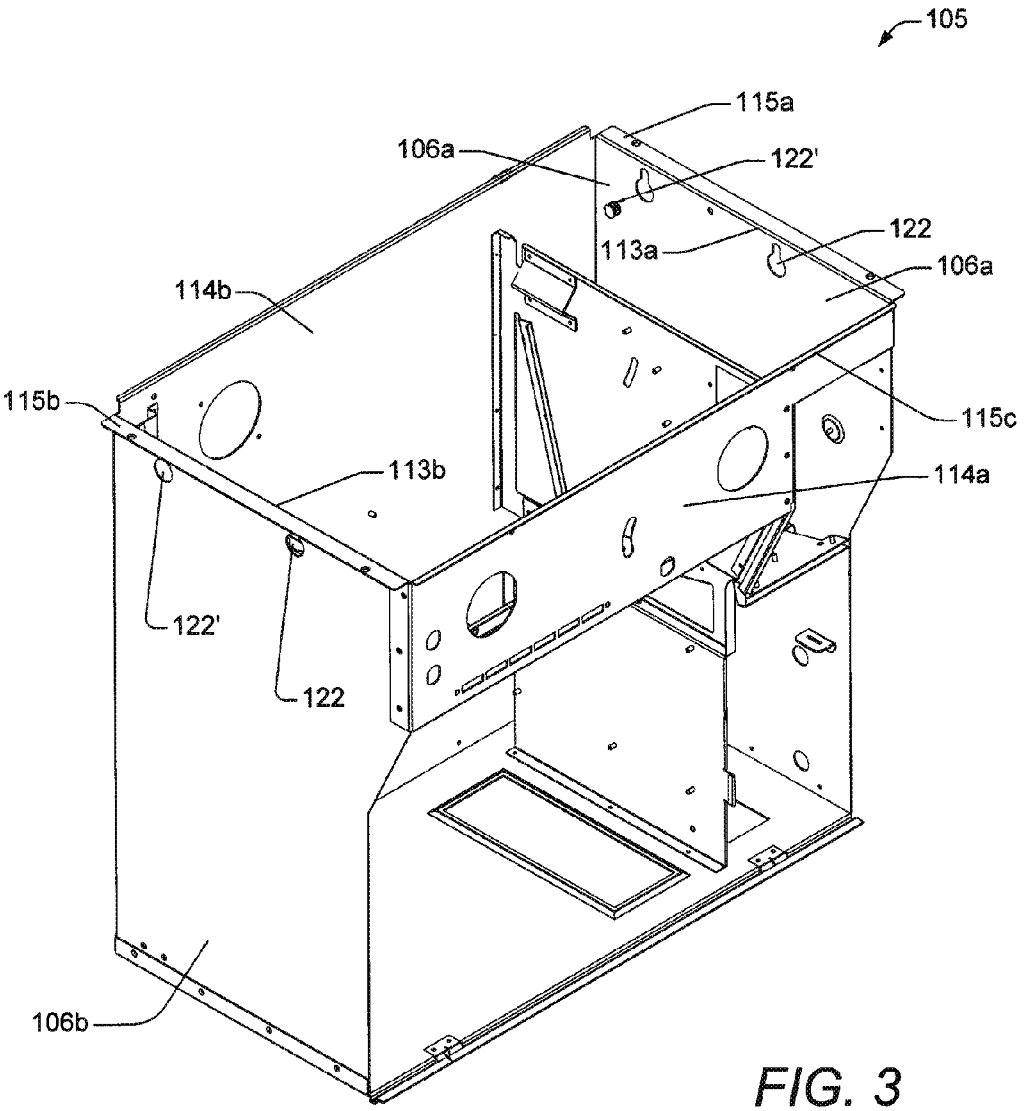
FIG. 3 is a top perspective view of a gaming machine frame of the gaming machine that incorporates keyhole slots of the mounting portion of the repositionable handle assemblies.
Figure 4:
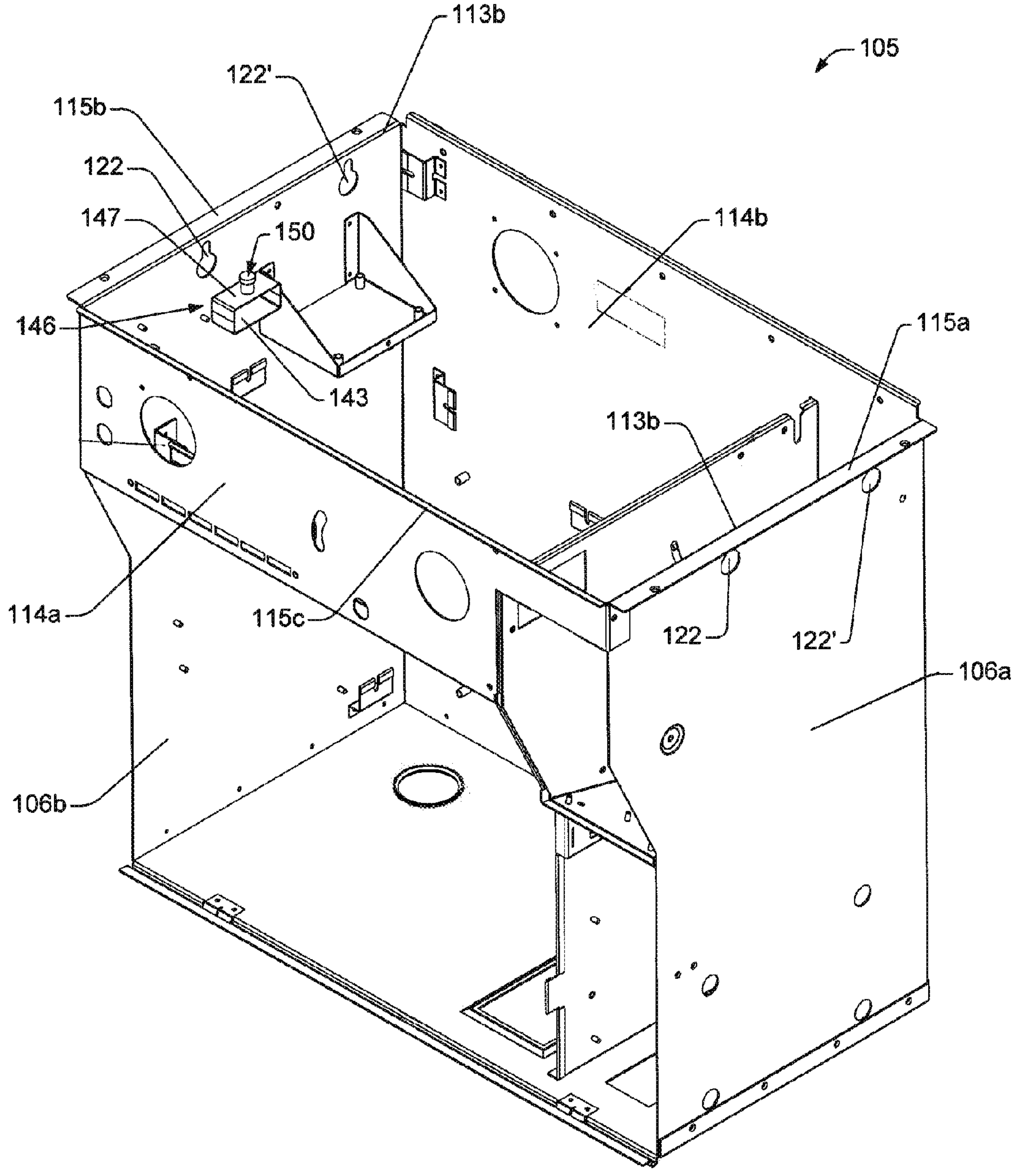
FIG. 4 is another top perspective view of the gaming machine frame of FIG. 3, further illustrating a docking assembly for an illumination assembly constructed in accordance with the present invention.

Referring now to FIGS. 3 and 4, a conventional gaming machine housing (or machine cabinet) or frame 105 for a "drop-in" installed or "drop-in-bar" style gaming machine assembly 100 is shown which includes at least two-spaced support walls 106*a*, 106*b*. In this particular configuration, the two support walls are generally parallel and opposed to one another. Still further, a pair of cross-walls 114*a*, 114*b* having opposed ends mounted to the respective support walls 106*a*, 106*b*, providing structural integrity for the entire frame. In this particular illustration, the support walls 106*a*, 106*b* and the cross-walls 114*a*, 114*b* are generally vertically oriented, forming a rectangular-shaped support frame 105, although the cross-walls 114*a*, 114*b* may be skewed as well in some instances.

Extending outwardly from one or more of an upper edge portion of each wall is a generally horizontal mounting flange 115*a*-115*c*. In this particular example, at least two of the mounting flanges 115*a*, 115*b* are mounted to, but extend away from, the support walls 106*a*, 106*b*. These flanges provide a means for securely seating, as well a way of affixing, the frame 105 of the gaming machine assembly 100 in the tabletop opening 102.

Figure 2:
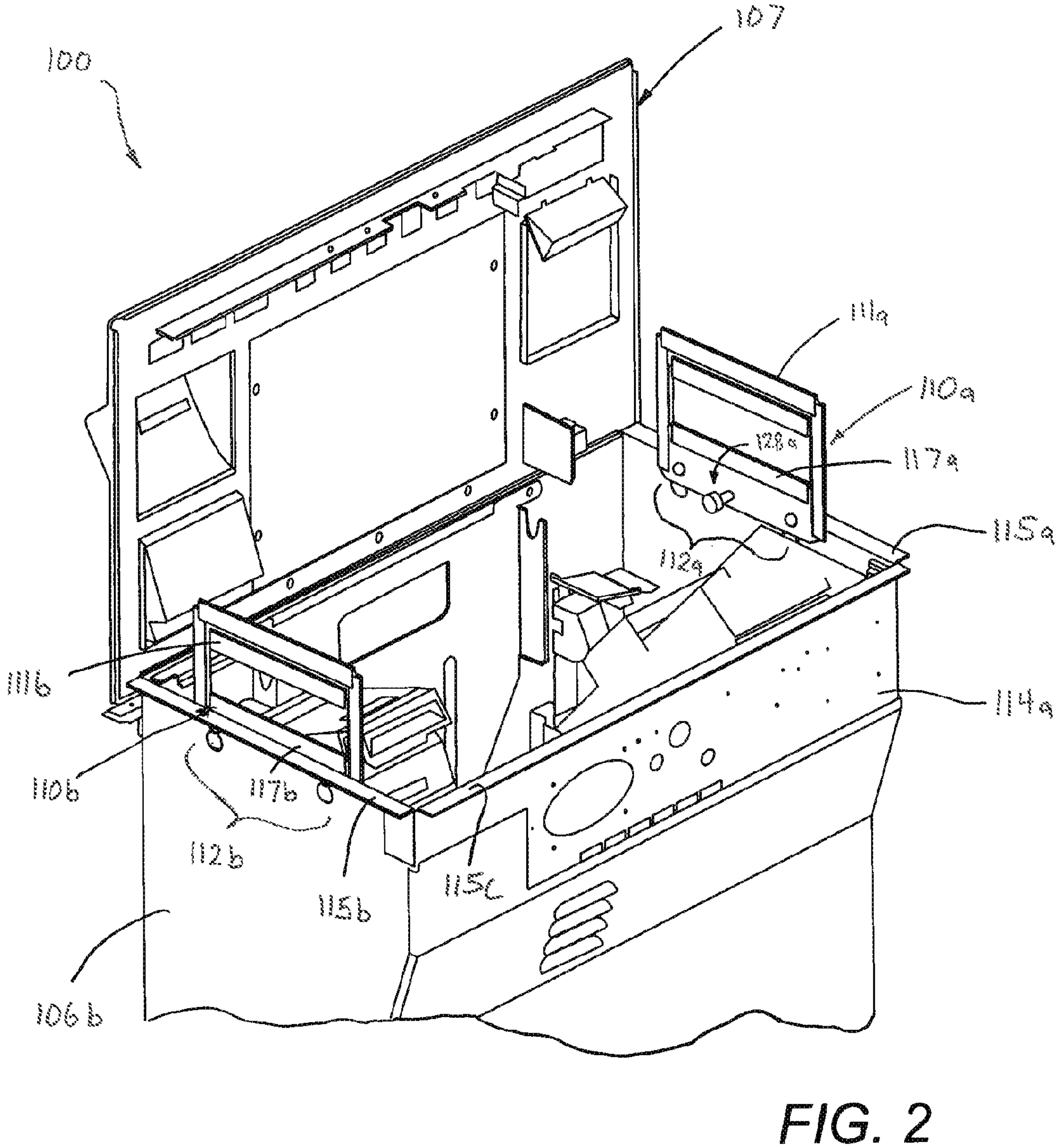
FIG. 2 is a top perspective view of the gaming machine of FIG. 1 with the top panel assembly in an opened condition, and incorporating repositionable handle assemblies constructed in accordance with the present invention.
Figure 5:
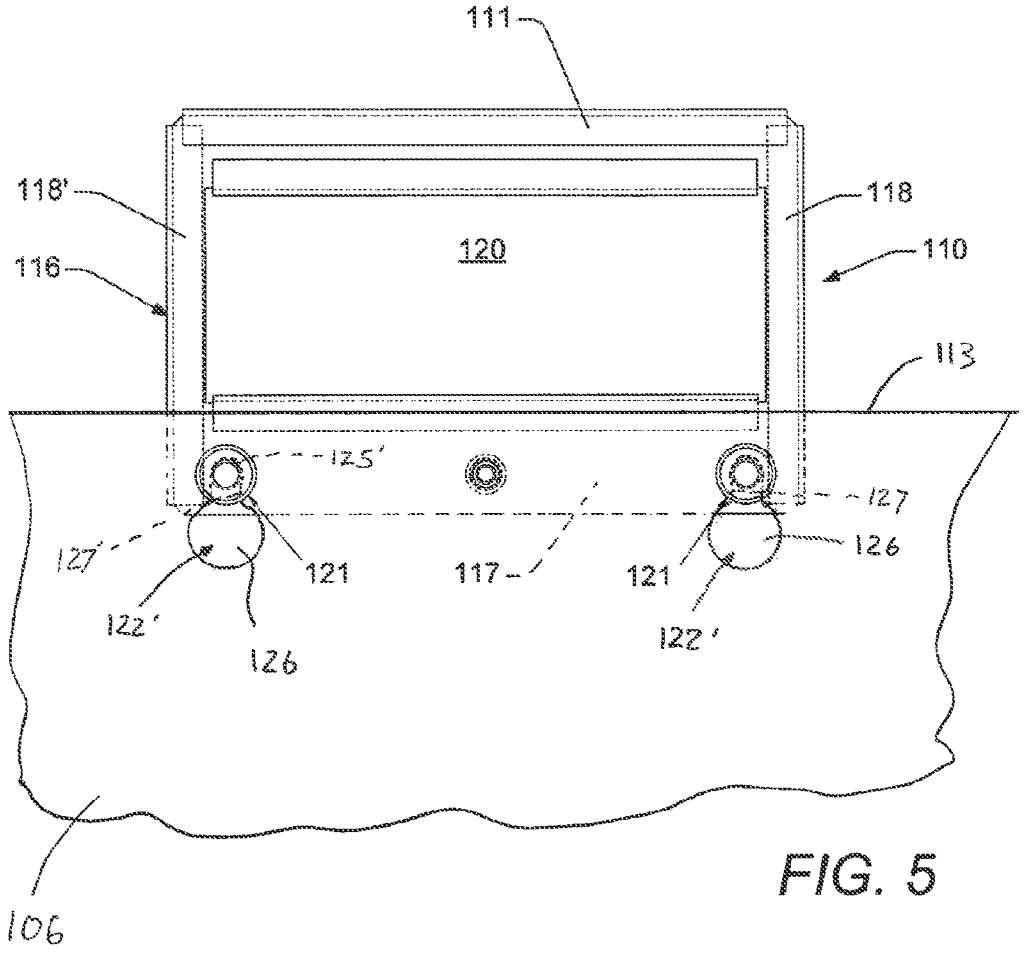
FIG. 5 is a fragmentary, enlarged, front elevation view of the repositionable handle assembly of FIG. 2, in a second position.

As best illustrated in FIGS. 2, 5 and 6, the handle assemblies 110*a* and 110*b*, will now be described in detail. For the ease of description and clarity, however, the "a" and "b" component references will not be used. As shown, each handle assembly 110 includes a handle body 116 that defines the handle member 111, which is oriented generally horizontally, and a base portion 117 that includes at least a portion of the respective mounting portion 112 thereon. The base portion 117 is coupled to the handle member 111 through at least one support post 118 extending therebetween. In this particular illustration, as shown in FIG. 5, two spaced-apart support posts 118, 118' are provided at the opposed ends of the handle member 111. Collectively, in this embodiment, the handle member 111, base portion 117 and spaced support posts 118, 118' define a recess 120 that essentially enables gripping of the handle by a gaming machine technician's fingers.

In at least one embodiment, each handle member 111 may be formed in a manner that provides a comfortable grip surface and may be sized to allow the use of two hands. According to different embodiments, the handles may be formed using different types of materials such as, for example, metal (e.g., steel, aluminum, brass, nickel, titanium, etc), wood, plastic, nylon, polypropylene, resins, rubber or any combination thereof. Other materials may also be applied that have physical and/or structural properties sufficient to allow the material to be used as a handle which may be fastened to the gaming machine frame, and sufficient to allow material to support the gross weight of the gaming machine (e.g., 150-200 lbs.) without failure.

In some embodiments, the handle body 116 may be formed using a substantially rigid plate-like material (such as folded metal that is illustrated in the Figures). Such a substantially rigid material facilitates physical manipulation and/or positional control of the gaming machine during lifting and installation into the bar top cavity.

In other embodiments, the handle member 111 may be formed with a flexible material (e.g., string, wire, rope, webbing, straps, etc. (not shown)). In at least one embodiment, the handle member may be comprised of a non-conductive material, or have an outer coating or surface coating that is electrically non-conductive (e.g., rubber, plastic, etc.).

In the second position, the handle member 111 is easily exposed relative to the gaming machine frame 105 to enable gripping and handling of the handle assembly 110. In one particular configuration, as shown on FIGS. 5 and 6B, the respective handle member 111 is oriented above an upper edge 113 of the respective support wall 106. Access and exposure of the handle members 111*a*, 111*b*, thus, is provided during handling of the gaming machine assembly without obstruction with the frame support walls 106*a*, 106*b*.

Such access to the handle assemblies 110*a*, 110*b*, in the second position, generally requires the top panel assembly being oriented in the opened condition (FIG. 2). Incidentally, the top panel assembly 107 is preferably hingeably mounted to the frame 105 on one side or edge thereof. This panel assembly 107 can then rotate or hinge between the closed condition (FIG. 1), enabling operative use thereof, and the opened condition (FIG. 2), enabling access to the gaming machine electronics housed in the frame 105. It will be appreciated, however, that the top panel assembly can be movably mounted or coupled to the frame 105 using any conventional or accepted technique.

In accordance with this embodiment of the present invention, and as already indicated above, one particular configuration provides corresponding mounting portions 112*a*, 112*b* that are detachably mounted to the frame 105, in the second position, and are completely detached from frame 105, in the first position. A particular benefit of this arrangement is that the same handle assemblies can be mounted to, and used with, any gaming machine frame that incorporates corresponding mounting portion components that enable mounting thereto.

FIGS. 5-9 illustrate various embodiments of this detachable handle assembly 110 (and components thereof) which may be attached to the gaming machine frame. In one configuration (FIGS. 5-8), the mounting portion 112 is provided by a set of mounting knobs 121, 121' and corresponding keyhole slots 122, 122' that interengage one another. Either the handle body 116 or the corresponding support wall 106 can support the mounting knobs, while the other of the support wall 106 or the handle body 116 can define the corresponding keyhole slots 122, 122'. These corresponding components of the mounting portion 112 cooperate to removably interengage, in the second position, and detach from one another, in the first position.

Preferably, the base portion 117 includes one or more of these mounting knobs 121, 121" are onto its surface thereof. Preferably, at least two spaced mounting knobs 121, 121' are mounted to base portion to spread the loads, although providing only one mounting knob can be easily designed.

Again, of the ease of description and clarity, only one mounting knob 121 and corresponding keyhole slot 122 will be described in detail. Referring now to FIGS. 5 and 6, each mounting knob 121 includes a circular head portion 123, and a smaller width neck portion 125, forming essentially a doorknob or mushroom shaped device. Briefly, while the shape of the head portion 123 and the neck portion 125 are circular and/or cylindrical, other geometric shapes are acceptable as well.

Figure 6A:
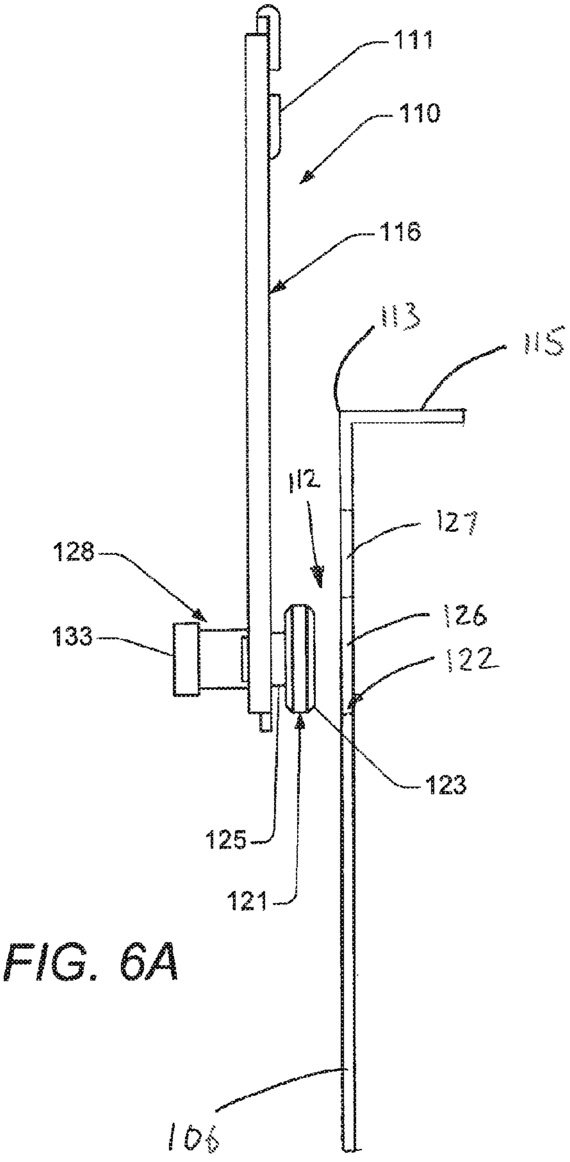
FIG. 6A is a fragmentary, enlarged, side elevation view of the repositionable handle assembly of FIG. 5, in a first position.
Figure 6B:
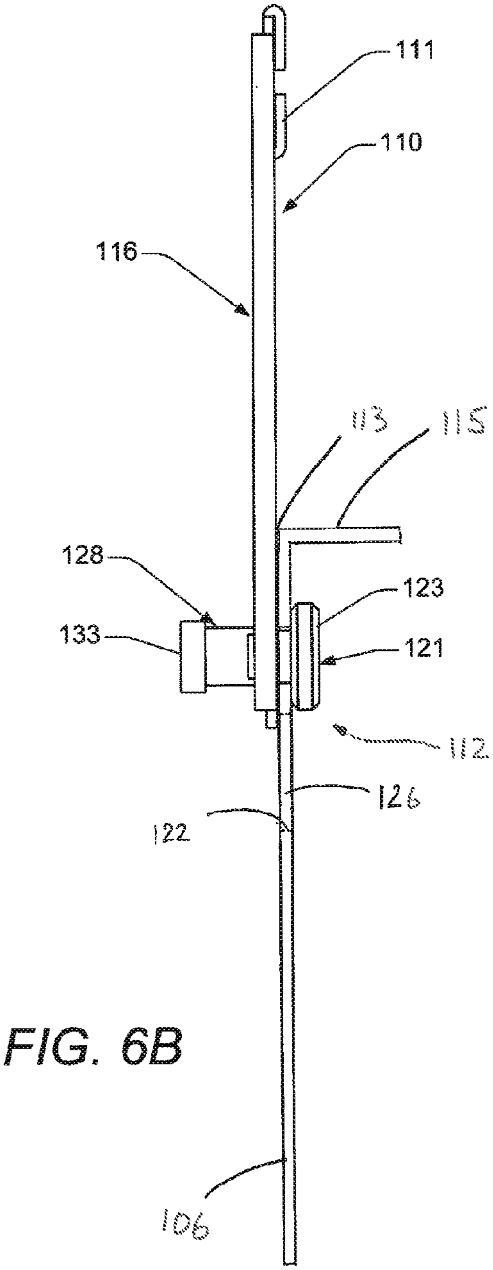
FIG. 6B is a fragmentary, enlarged, side elevation view of the repositionable handle assembly of FIG. 6A, in the second position.

In one particular embodiment, the neck portion 125 of the mounting knob 121 is affixed to the base portion 117 of the handle body 116. Such mounting can be performed using any conventional mount method such as screws, bolt, rivets, welding, etc. Accordingly, as best illustrated in FIGS. 6A and 6B, the head portion 123 is spaced from the support wall 106 by the length of the neck portion 125. This mounting knob 121, thus, forms a doorknob shape arrangement that can be interengage with the corresponding keyhole slot 122 that extends through the support wall 106. In one particular arrangement, thus, the length of the knob neck portion 125 is only slightly larger than the thickness of corresponding support wall. In another example, however, the tolerance between the length of the knob neck portion 125 and the thickness of corresponding support wall 106 may be even tighter, such that a friction fit type arrangement occurs, retaining the handle assembly 110 in the second position.

Figure 10:
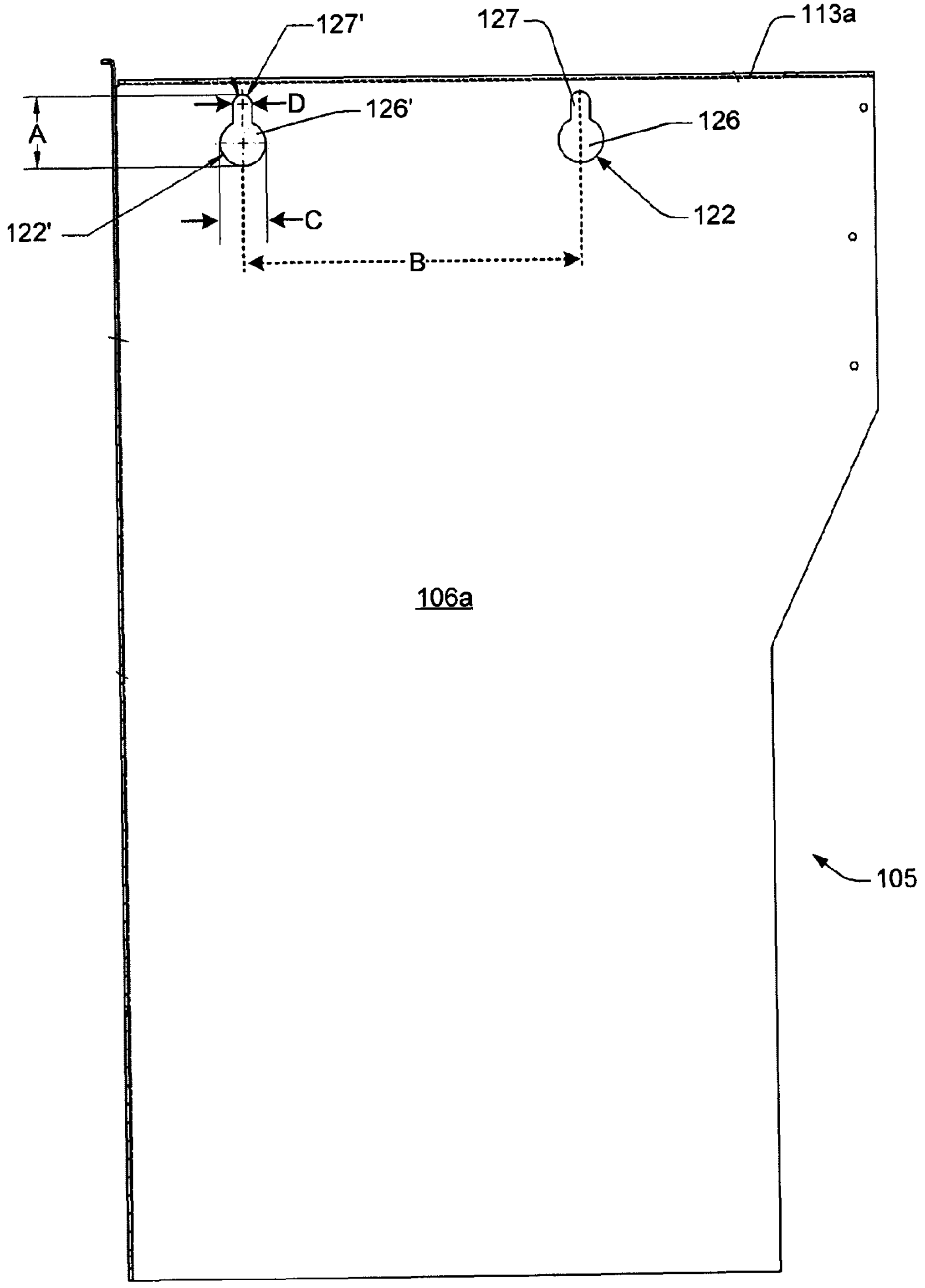
FIG. 10 is a front elevation view of the support wall of the gaming machine frame, illustrating the keyhole slots defined thereby.

As illustrated in the example of FIGS. 3 and 10, these keyhole shaped slots 122, 122' are specifically configured or designed to facilitate interengagement with a respective mounting knob 121, 121' of the handle assembly 110. Each keyhole slot 122, 122' includes a first portion 126, 126' having a transverse cross-sectional dimension sized and shaped for sliding receipt of the knob head portion 123 transversely therethrough. Each keyhole slot 122, 122' further includes a second portion 127, 127' in communication with the corresponding first portion 126, 126'. The width dimension of the slot second portion 127 is smaller than that of the knob head portion (and thus the slot first portion 126), but is sized for sliding receipt of the knob neck portion longitudinally therealong. Moreover, as best viewed in FIGS. 5 and 10, the second portion 127 of the keyhole slot 122 is oriented and aligned vertically above the larger diameter first portion 126.

In one particular embodiment, an exemplary handle body 116 is shown in FIG. 10 illustrating various dimensions (e.g., A, B, C, D) relating to respective keyhole slot 122 which may be applied to facilitate attachment of a handle to gaming machine frame 105. According to a specific embodiment, the dimensional variables A, B, C, D of FIG. 10 may have the following values: A=about 1.4 inches, B=about 6.5 inches, C=about 0.9 inches and D=about 0.4 inches It will be appreciated, however, that the various dimensional values described herein are provided for purposes of illustrating an example of a specific embodiment. Moreover, it is to be understood that other embodiments may include at least a portion features/components having dimensional values that are different from those specifically illustrated in the drawings and/or described in the specification of the present application.

Accordingly, to attach the handle assembly 110, the spaced mounting knobs 121, 121' are aligned with the corresponding keyhole slots 122, 122' that are defined in the support walls 106, which of course are placed in alignment therewith. Once the knob head portions 123, 123' are aligned with the corresponding first portions 126, 126' of the keyhole slots 122, 122', the handle body 116 can be moved toward the support wall until the head portions extend through the corresponding slot first portions. The handle body 116 can then be urged upwardly, via the handle member 111, moving the knob neck portions 125, 125' into sliding engagement with the corresponding slot second portions 127, 127'. In accordance with the present invention, while the knob neck portions 125, 125' are oriented in the corresponding slot second portions 127, 127', in the first position of the mounting portion 112, the larger width of the head portions 123, 123' prevents removal or axial dislodgment therefrom, from the second. In this orientation, the handle assembly 110 is placed in the second position (FIGS. 2, 5 and 6B) and is now operable to facilitate lifting and manipulation of the gaming machine assembly.

In at least one embodiment, the handle assemblies 110*a*, 110*b* may include a locking assembly 128 that releasably retains the handle assembly in the second position. Retaining the respective handle body 116 in the second position, of course, prevents inadvertent removal or detachment when the handle members 111*a*, 111*b* are not being operated. Otherwise, in some instances, the weight of the handle assemblies themselves may cause dislodgement.

Locking of the handle body, in the second position, to the corresponding support wall 106, can be performed in many different embodiments. For instance, the mounting knobs 121, 121' may releasably frictionally engage against the support wall 106 with a separate mechanism, or simply friction fit the support wall between the handle body 116 and the knob head portions 123, 123', as mentioned above.

Figure 11B:
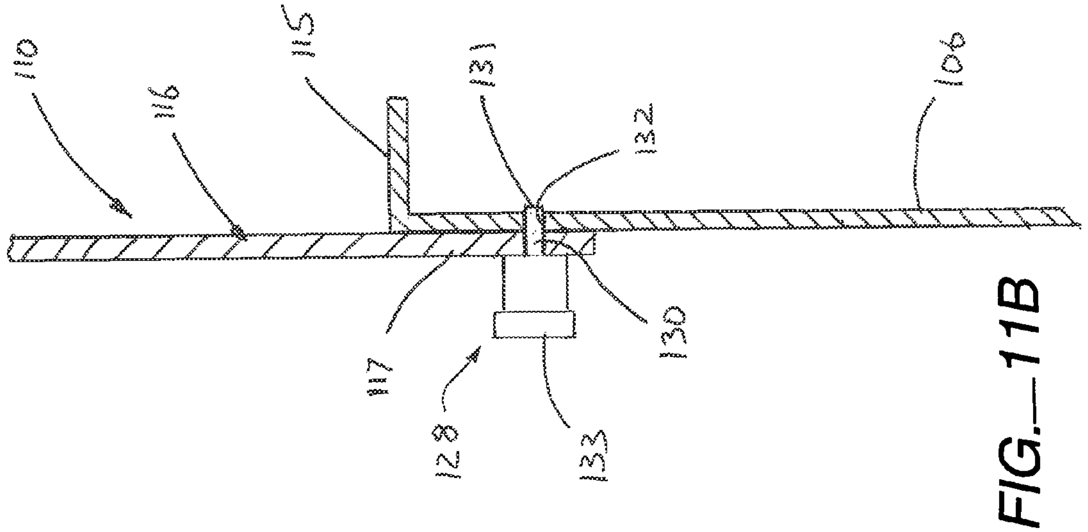
FIG. 11B is a fragmentary, side elevation view of the locking assembly of FIG. 11A, in an extended condition.
Figure 11A:
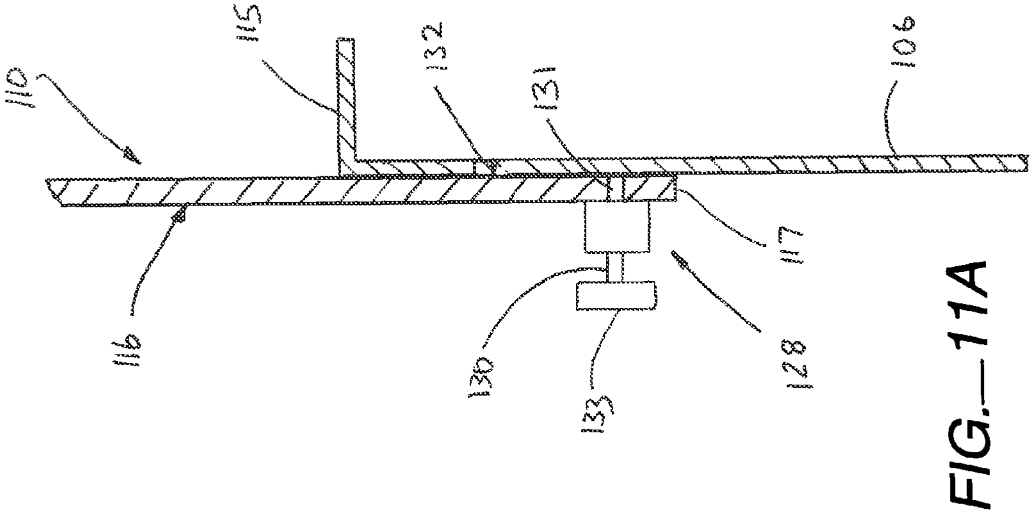
FIG. 11A is a fragmentary, enlarged, side elevation view of a locking assembly for the handle assembly, in a retracted condition.

Another specific locking assembly arrangement, however, is shown in FIGS. 6, 11A and 11B. In this embodiment, the handle body 116 is releasably locked to the corresponding support wall 106. Such a locking assembly 128, in one embodiment, includes one or more movable locking pins 130, each having a tip portion 131 that is configured for sliding engagement in a corresponding pin aperture 132. These pin apertures 132 are defined by the gaming machine frame 105, and are strategically aligned and sized to position the handle member above the support wall upper edge, in the corresponding second position. In other words, insertion of the locking pin tip 131 into the corresponding pin aperture 132 temporarily locks the handle body 116 against the support wall 106, retaining the handle assembly against the corresponding support wall, in the second position.

In at least one embodiment, locking pin 130 is configured for reciprocal movement in a direction along it longitudinal axis between a retracted condition (FIG. 11A) and an extended condition (FIG. 11B). In the extended condition, the tip portion 131 of the locking pin 130 is displaced axially in a distal direction toward, and into locking engagement with the pin aperture 132, essentially preventing any significant lateral movement of the handle body, relative to the support wall 106. In particular, the handle body 116 is prevented from displacing downwardly, where the mounting knobs 121, 121' can be repositioned in alignment with the corresponding first portions 126, 126' of the keyhole slots 122, 122', enabling removal of the knob devices, and hence, the handle assemblies therefrom.

In contrast, in the retracted condition, the distal tip portion of the locking pin 130 is retracted out of locking engagement with the corresponding pin aperture 132, enabling the handle body 116 to displace downwardly from its orientation in the second position toward the first position. Any such retraction may be manually manipulated by pulling a gripping knob 133 coupled to proximal end of the locking pin 130. Such manipulation displaces the locking pin 130, and thus the distal tip portion 131, axially in a proximal direction away from, and out of engagement with the corresponding pin aperture 132. As mentioned, the handle body 116 with then be allowed to displace downwardly, moving the knob neck portion 125, 125' out of engagement with the corresponding keyhole second portions 127, 127' so that the handle assembly can be removed from the gaming machine frame 105, if desired.

In the example of FIGS. 11A and 11B, the locking assembly 128 includes an internal biasing device 133 that biases the distal pin tip portion 131 of the locking pin 130 toward the extended condition. Accordingly, as the mounting knobs 121, 121' are moved upwardly such that knob neck portions 125, 125' are slideably urged into the keyhole slot second portions 127, 127', the biasing device 133 will automatically urge the distal tip portion 131 of the locking pin 130 into the corresponding pin aperture 132 when they are coaxially aligned with one another.

In one embodiment, the biasing device 133 may include a conventional spring element (not shown). One end of the spring may be coupled to a pin or latching element of the locking assembly, while the opposite end thereof contacts the support wall.

Figure 8:
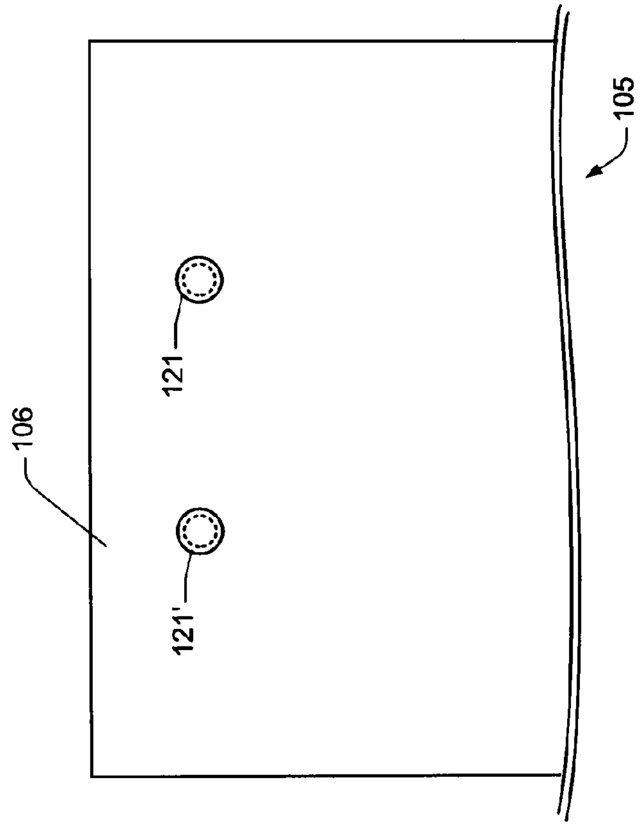
FIG. 8 is a fragmentary, enlarged, front elevation view of the alternative embodiment handle assembly of FIG. 7, illustrating the knob devices affixed to a support wall of the gaming machine frame.
Figure 7:
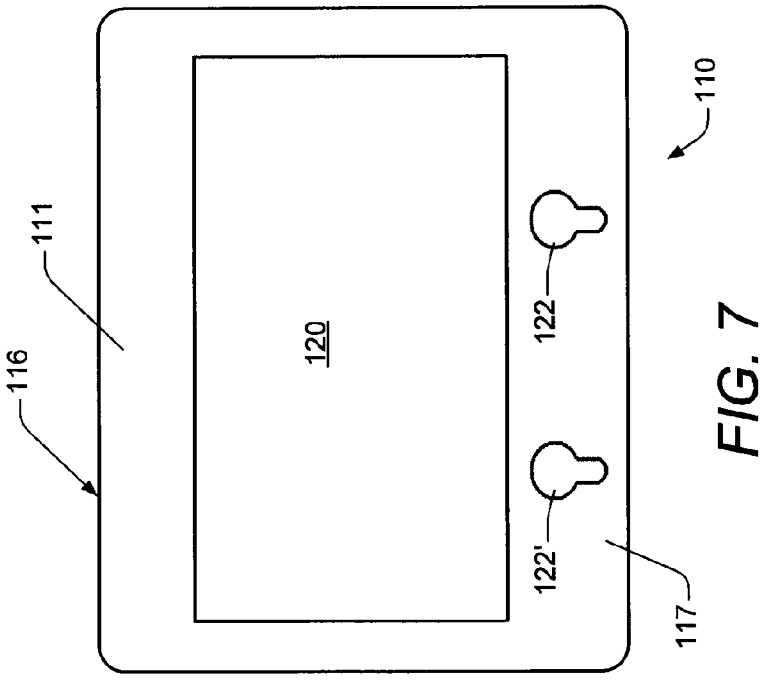
FIG. 7 is an enlarged, front elevation view of an alternative embodiment handle assembly, defining keyhole slots in a base portion thereof.

Briefly, it will also be appreciated that the components of the mounting portions 112*a*, 112*b* may reversed in that, for example, the mounting knobs 121, 121 may be mounted to the frame support walls 106*a*, 106*b*, while the keyhole slots 122, 122 maybe defined by the corresponding handle bodies 116. This particular embodiment is shown in FIGS. 7 and 8. It will be appreciated, of course, that the keyhole slots 122, 122' are inverted as compared to the previous embodiments.

Figure 9B:
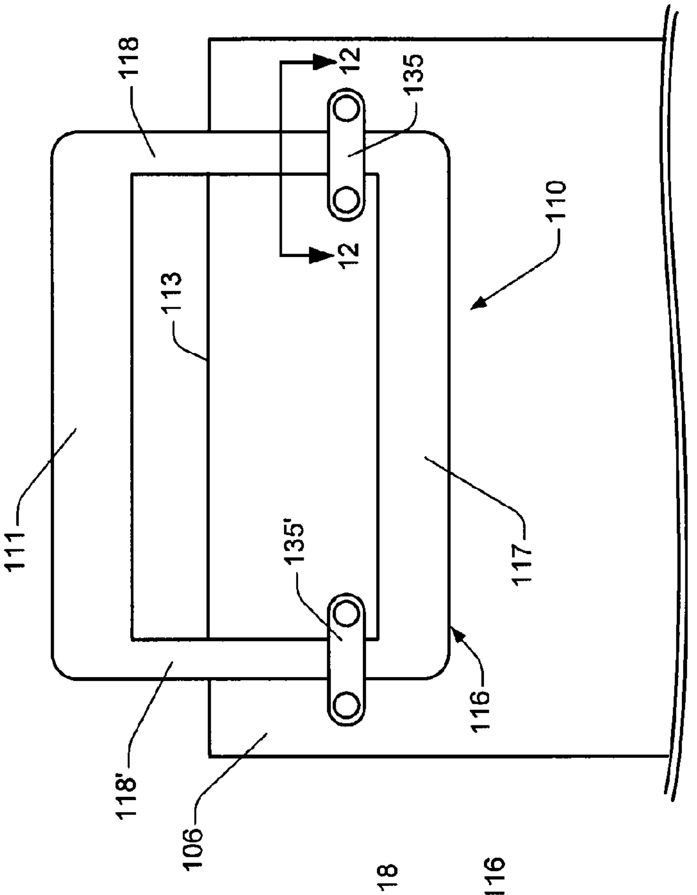
FIG. 9B is a front elevation view of the alternative embodiment handle assembly of FIG. 9A, showing the handle assembly in the second position.
Figure 9A:
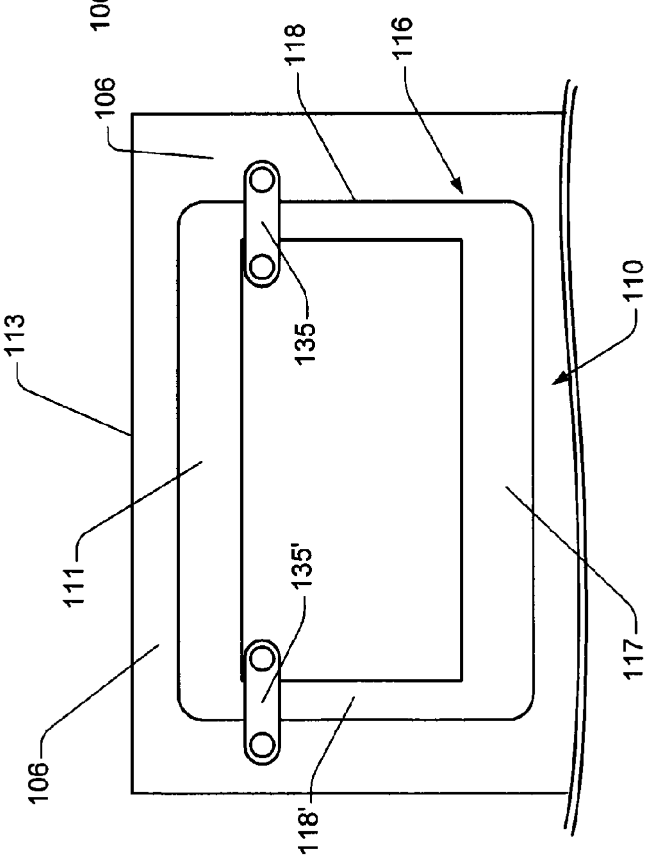
FIG. 9A is an enlarged, front elevation view of an alternative embodiment handle assembly, showing the handle assembly in the first position.
Figure 12:
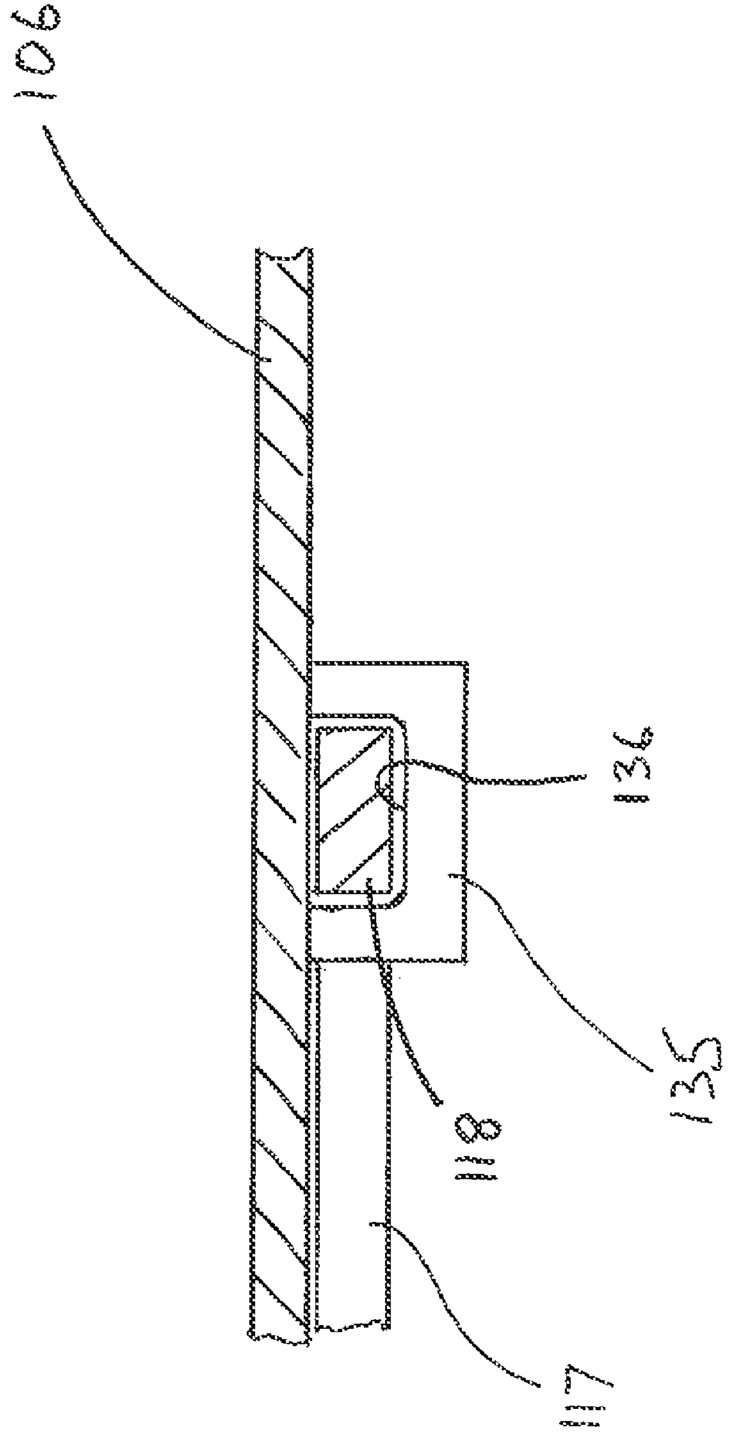
FIG. 12 is cross-sectional top plan, taken along the plane of the line 12-12 in FIG. 9B, and illustrating the alternative embodiments handle assembly.

Turning now to FIGS. 9A, 9B and 12, an alternative embodiment handle assembly 110 is illustrated that repositions handle member between the first position and the second position in a manner different from that of the detachable embodiment of FIGS. 5-8. In this particular configuration, the handle body 116 of the handle assembly 110 is non-detachable from the gaming machine frame 105, and more particularly, is slideably mounted to the gaming machine frame. For example, as illustrated in the example of FIGS. 9A and 9B, the handle body 116 is movably or slideably attached to frame support wall via one or more guide fasteners 135, 135'. Such a fastener may be formed to cooperate with the handle body 116 for sliding movement between the first position (FIG. 9A) and the second position (FIG. 9B).

For example, in its simplest form, the guide fastener 135 may be U-shaped such that when mounted to the support wall 106, the two components cooperate to define a receiving slot 136 (FIG. 12) formed and dimension for sliding receipt of the support post 118 of the handle body longitudinal therethrough. Accordingly, the transverse cross-sectional dimension of the receiving slot 136 must be at least as large, cross-sectionally, to accommodate sliding receipt of that of the support post 118 therethrough.

In one embodiment, the handle body 116 may be substantially similar or identical to that of the embodiment of FIG. 5, thus defining two spaced support posts 118, 118' that couple the base portion 117 to the handle member 111. In this embodiment, two guide fasteners 135, 135' are required, both of which slideable receive a corresponding support post 118, 118' between the first position and the second position.

In contrast, should a single guide fastener 135 be employed, the handle body 116 may employ a single, more centrally placed, support post, that extends between the handle member 111 and the base portion 117 (not shown). In this configuration, of course, cross-sectional dimension of the single support post, and the associated guide fastener, would be sufficient to singularly accommodate the weight of the gaming machine assembly 100 on the one side thereof.

In either embodiment, the handle member 111 is slideably mounted to the support wall 106 for movement between the first position and the second position. As shown in FIG. 9A, in the second position, the support posts 118, 118' are slideably received in the receiving slots of the guide fastener 135, 135' until the base portion 117, functioning as a stop mechanism, contacts the bottom surface of the guide fasteners. Such abutting contact limits the travel through the guide fasteners 135, 135', effectively retaining the handle member 111 in the first position. In this orientation, the handle member 111 is oriented above the upper edge 113 of the corresponding support wall 106 for gripping exposure thereof, when the top panel is oriented in the opened condition. Accordingly, when a gaming machine technician is pulling up on the handle members (e.g., 111), the corresponding base portion 117 contacts the corresponding guide fastener 135, which enables the gaming machine assembly 100 to be supported by the handle assemblies 110*a*, 110*b*.

In the first position, as shown in FIG. 9A, the handle body 116 slides downwardly until the bottom side of the handle member 111 contacts the upper surface of the corresponding guide fasteners 135, 135'. As mentioned, in the first position, the handle members are repositioned out of any obstructive contact and interference thereof with the movement of the top panel assembly 107 toward and to the closed condition (FIG. 1). In one specific example illustrated in FIG. 9A, the handle member 111 is slideably repositioned below the upper edge 113 of the corresponding support wall 106.

In most embodiments, the mere weight of the handle body 116 alone is sufficient reposition the handle assembly 110 toward the first position. Thus, should the technician relinquish their grip of the handle member 111, when oriented in the second position (FIG. 9B), the handle assembly 110 will be caused to reposition to the first position (FIG. 9A). However, in some instances, the tolerances between the receiving slots 136, 136' and the support posts 118, 118' may be tighter, such that the handle body 116 can be retained in its position, relative to the support wall 106, by frictional forces. Hence, in this configuration, any sliding movement between the position and the second position will require sliding manual manipulation by the gaming machine technician.

In another alternative embodiment handle assembly, the handle body may be pivotally mounted (not shown) to the support wall 110 for pivotal motion, about an axis generally parallel to both the support wall and the lower edge of the handle body. Hence, for example, turning to FIG. 6B shown in the second position, a hinge device may be included having one side mounted near the lower edge of the handle body, and an opposite side mounted to the support wall 106, with a pivotal axis of the hinge device extending in a direction generally perpendicular to, and into, the plane of the figure.

The handle assembly would then be pivotally mounted to the side wall 106 such that the handle body 116 would be capable of rotating about the pivotal axis of the hinge device from the second position to the first position (not shown in FIG. 6B). In this first position orientation, the handle member 111 would then be inverted to an orientation below both the hinge device and the lower edge of the handle body, but adjacent the support wall.

A biasing device may be included to bias the orientation of the handle body 116 toward the first position during non-use. Such a biasing device may be provided by a torsion spring or the like. Hence, during operation, the technician will be required to rotate the handle body back to the upright second position with enough force to overcome the torsional force of the spring.

In accordance with another aspect of the present invention, an interior illumination assembly, generally designated 136, is provided for the gaming machine assembly interior that is removably mounted to the gaming machine frame 105. Briefly, as shown in FIGS. 4 and 13-15, the interior illumination assembly 137 includes a multifunctional shield device 140 and an inspection lamp 138 mounted thereto. The illumination assembly 137 is docked in an interior cavity 143 of a docking assembly 146, during nonuse (e.g., FIG. 14), but can be removed therefrom by a technician for operable use (e.g., FIG. 13)

The shield device 140 provides multiple functions, such as deflecting/reflecting light illuminating from the lamp, as well as providing a convenient gripping medium to allow the technician to manipulate the directional lighting of the lamp itself. The shield also functions as a heat dissipation device for dissipating heat generated from the light source (e.g., bulb). Further, the shield device may be used as a securing device for removably securing and dock the light source to the gaming machine frame. Finally, the shield device, of course, may be used as a light shielding device to shield light from the light source from shining directly into the eyes of a user inspecting the interior of the gaming machine unit.

In one specific configuration, the shield device 140 is generally trapezoidal in the transverse cross sectional dimension. As best viewed in FIGS. 13 and 14, the shield device includes a generally rectangular upper support plate 141 with a pair of flange plates 142, 142' tapering or flaring outwardly therefrom. As mentioned above, the transverse cross-sectional dimension of the shield device 140 is formed for receipt in the frame interior cavity 143.

A relatively large hole or aperture 145 extends through at least one of the flange plates. This aperture 145 facilitate finger gripping and manipulation of the shield device 140 during use and operation thereof.

The shield device may be comprised of any rigid material, but must be able to withstand the heat generated by the inspection lamp. Such material, for instance, include aluminum or steel, as well as any metallic material similar to that composing the gaming machine frame 105. Further, although the shape of the shield device is generally trapezoidal in cross-section, other shapes are acceptable, but should at least be sized for docking in the frame interior cavity 143.

The inspection lamp 138 is preferably affixed to the underside of the upper support plate 141, using the underside surfaces of the flared flange plates 142, 142' to reflect and diffuse the light originating from the lamp. Techniques to affix the lamp to the support plate can be provided using any conventional mounting methods. In at least one embodiment, the light source of the inspection lamp 138 may be an incandescent light source, a fluorescent light source, a diode (e.g., LED) light source, and or other types of visible light sources generally known to one having ordinary skill in the art.

Further, the illumination assembly may be wired or battery powered, using conventional battery technology. For example, a rechargeable battery pack may be incorporated such that, when the shield device 140 is docked in the docking assembly 146, in a docked condition as will be described, the rechargeable battery pack can be charged.

Figure 13:
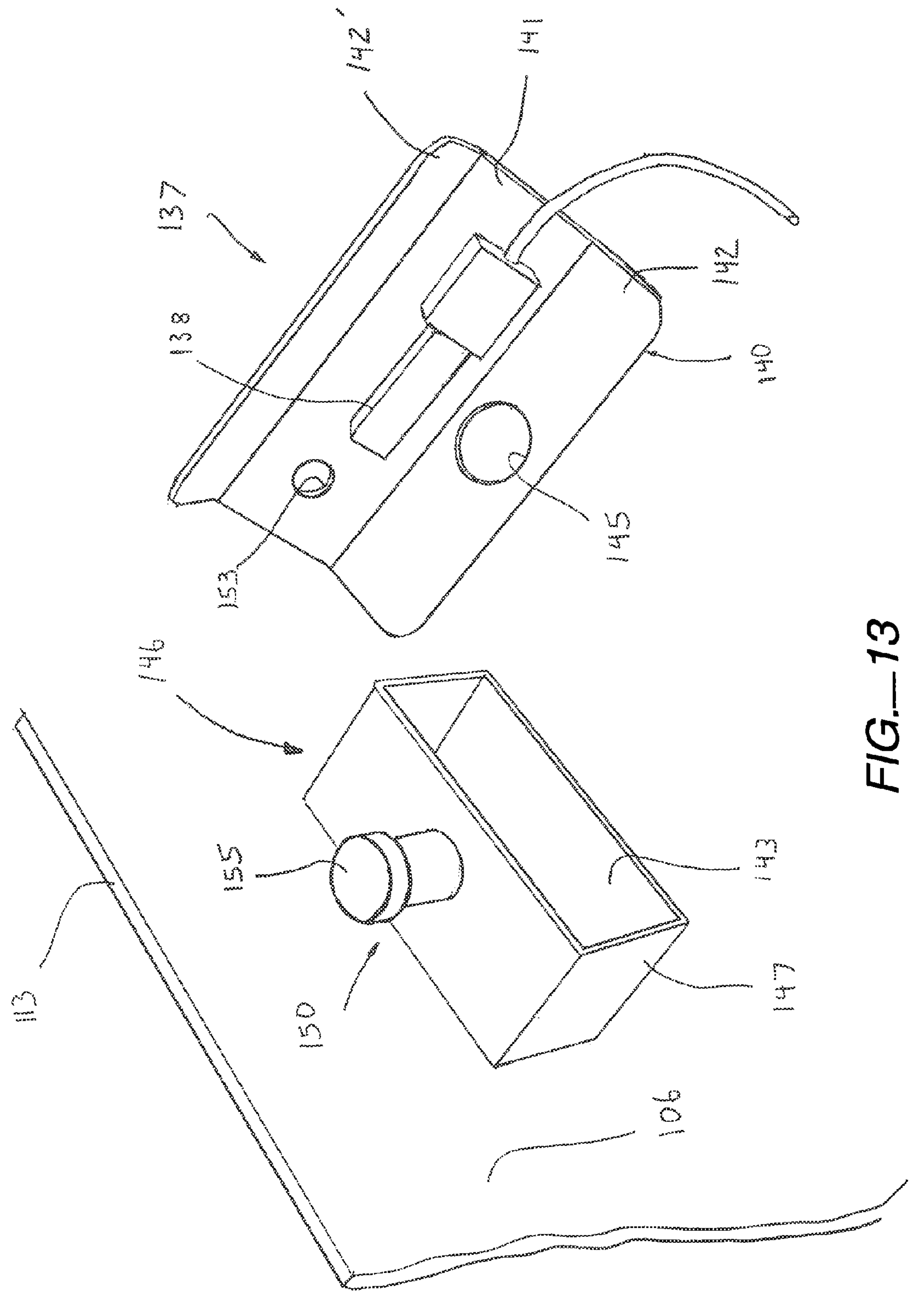
FIG. 13 is a fragmentary, enlarged, top perspective view of the docking assembly and the interior illumination assembly of FIG. 4, ready for operable use.
Figure 14:
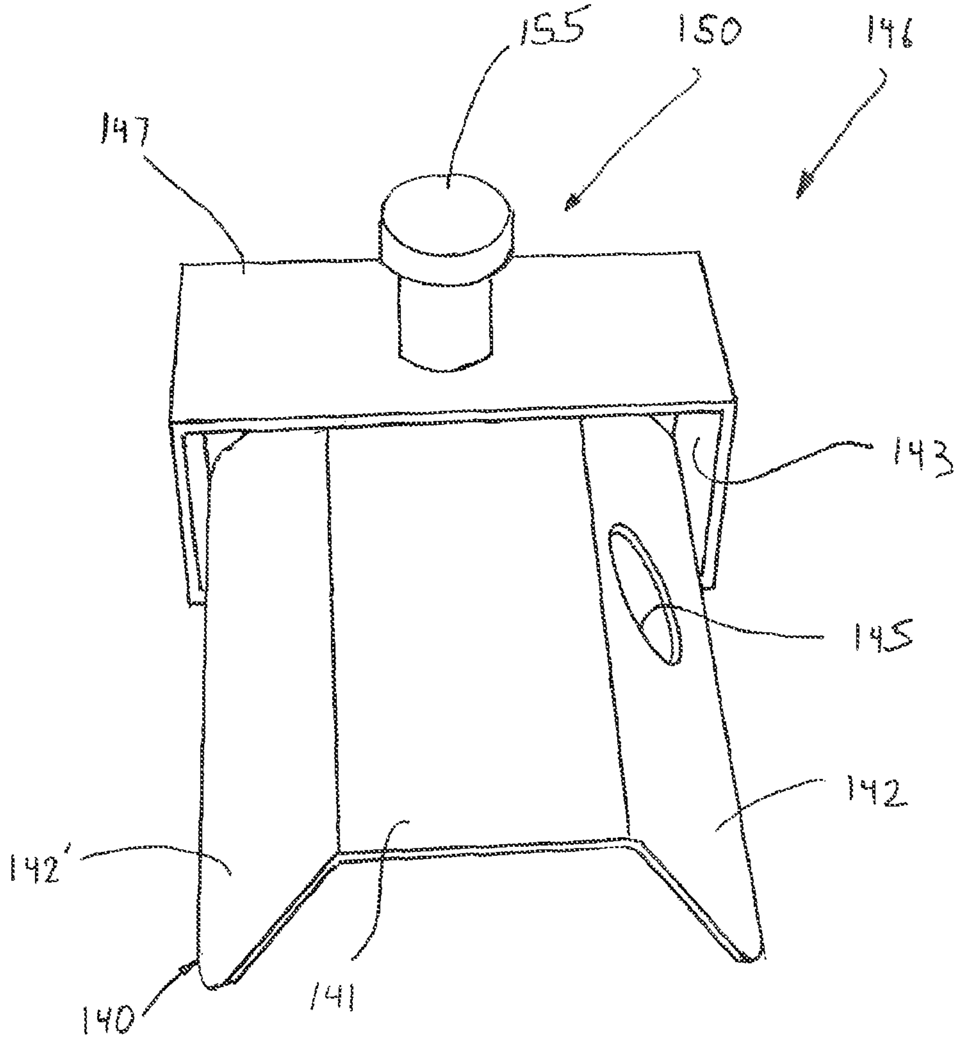
FIG. 14 is a top perspective view of the docking assembly and the illumination assembly of FIG. 13, in a docked condition.

The docking assembly 146, which is mounted to the gaming machine frame 105, provides detachable support for the illumination assembly 136 during nonuse. As illustrated in the example of FIGS. 13 and 15, the docking assembly 146 includes a dock frame 147 that defines an opening into the generally rectangular interior cavity 143.

The dock frame may be comprised of any rigid material, such as, for instance, a metallic material similar to that comprising the shield device 140 or the gaming machine frame 105. Further, although the shape of the frame interior cavity 143 is generally rectangular, it will be appreciated that any shape is acceptable as long as the shield device and inspection lamp can be stored therein.

In at least one embodiment, the shield device 140 of the illumination assembly is sized and dimensioned for sliding receipt in the interior cavity 143 of the dock frame 147 to the docking condition (FIG. 14) for docking thereof. To releasably retain the illumination assembly 137 in the dock condition, a lock mechanism 150 cooperates between the illumination assembly 137 and the docking assembly 146 that secures at least a portion of the shield device 140 in the dock frame interior cavity 143.

Figure 15A:
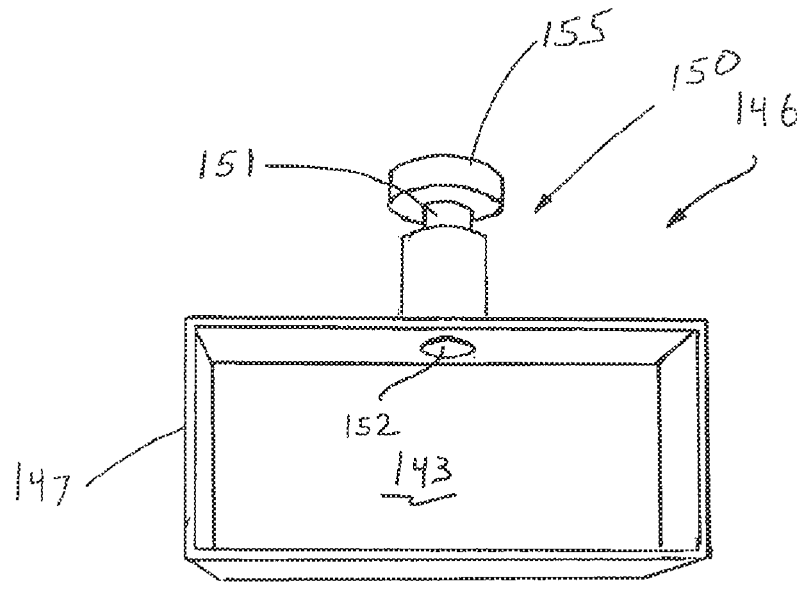
FIG. 15A is a bottom perspective view of the docking assembly of FIG. 13, with a locking mechanism in a release condition.
Figure 15B:
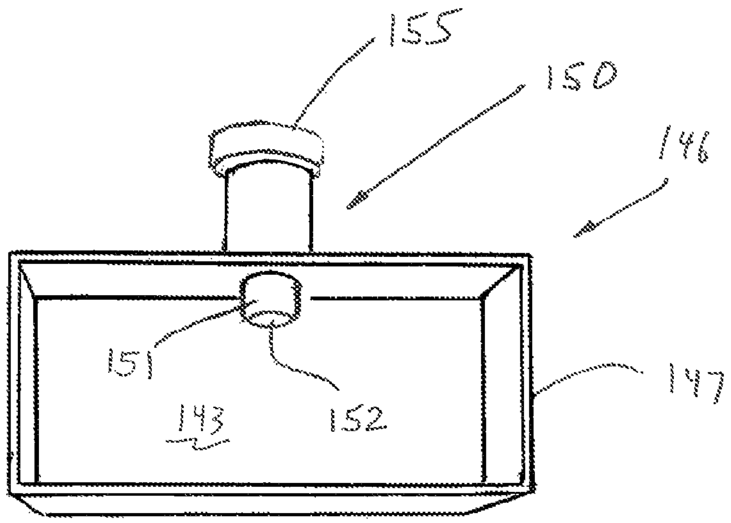
FIG. 15B is a bottom perspective view of the docking assembly of FIG. 15A, with the locking mechanism in a lock condition.

Referring now to FIGS. 15A and 15B, in at least one embodiment, the lock mechanism 150 includes a movable locking pin 151 reciprocally mounted atop the dock frame 147 between a lock condition (FIG. 15B), preventing removal of the illumination assembly from the dock condition, and a release condition (FIG. 15A), releasing engagement with the shield device 140 to enable manual removal thereof.

In one embodiment, the lock mechanism 150 includes a movable locking pin 151 having a distal tip portion 152 that is configured for sliding engagement in a corresponding a pin slot 153 defined by the upper support plate 141 of the shield device 140. This pin slot 153 is strategically aligned and sized to enable insertion and engagement of the pin tip portion 152 therewith, when the illumination assembly 137 is placed at the docking condition.

As mentioned, the locking pin 151 is configured for reciprocal movement in a direction along its longitudinal axis between the release condition and the lock condition. In the lock condition, the tip portion 152 of the locking pin 151 is displaced axially in a distal direction toward (downwardly in this orientation), and into locking engagement with, the shield pin slot 153, essentially preventing any significant lateral displacement of the shield device 140, relative to the dock frame 147. In particular, the illumination assembly 137 is prevented from removal from the frame interior cavity 143 for use and operation thereof.

In contrast, in the retracted condition, the distal tip portion of the locking pin 151 is retracted out of locking engagement with the corresponding pin slot 153, enabling the illumination assembly to be removed from the frame interior cavity. Any such retraction may be manually manipulated by pulling upwardly on a gripping knob 155 coupled to proximal end of the locking pin 151. Such manipulation displaces the locking pin 151, and thus the distal tip portion 152, axially in a proximal direction away from, and out of engagement with the corresponding pin slot 153.

The lock mechanism 150 may include a biasing device (not shown) that biases the tip portion 152 of the locking pin 151 toward the lock condition. Accordingly, as the distal end of the shield device 140 is inserted, head first, through the opening 148 of the interior cavity 143, the contact with the distal tip portion of the locking pin 151 forces the pin proximally. When the locking pin 151 is substantially coaxially aligned with the pin slot 153, the biasing device will automatically urge the distal tip portion 152 of the locking pin 151 into the corresponding pin slot 153, retaining the illumination assembly in the lock condition.

In one embodiment, the biasing device may include a conventional spring element (not shown). One end of the spring may be coupled to a pin or latch element of the lock mechanism 150, while the opposite end thereof contacts the support frame 105.

It will be appreciated that the forgoing embodiments are only a few illustrations of added functionality that can be applied using the structures of the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A gaming machine assembly, said gaming machine assembly comprising:

a master gaming controller;

a memory;

a support frame, the support frame housing the master gaming controller and the memory;

a top panel assembly supporting a display device, the top panel assembly movably connected with the support frame and configured for movement between a closed position and an open position to enable access to the support frame; and an illumination assembly including a shield and a lamp mounted to the shield; and a docking assembly coupled to the support frame, the docking assembly defining an interior cavity dimensioned for receipt of the illumination assembly, wherein the illumination assembly is configured to be removably docked with the docking assembly, wherein the gaming machine assembly is configured for mounting in a bar top or tabletop through an opening in a top surface of the bar top or the tabletop.

2. The gaming machine assembly as recited in claim 1, wherein the shield includes a gripping region configured to facilitate gripping of the illumination assembly.

3. The gaming machine assembly as recited in claim 1, wherein the lamp comprises an incandescent light source, a fluorescent light source, or a diode light source.

4. The gaming machine assembly as recited in claim 1, further comprising a power source for the lamp.

5. The gaming machine assembly as recited in claim 4, wherein the power source is a battery.

6. The gaming machine assembly as recited in claim 5, wherein the battery is rechargeable.

7. The gaming machine assembly as recited in claim 6, wherein the docking assembling includes a recharging interface configured to recharge the battery when the illumination assembly is docked in the docking assembly.

8. The gaming machine assembly as recited in claim 1, wherein the shield is made of a metallic material.

9. The gaming machine assembly as recited in claim 1, wherein the shield comprises an upper support plate and two adjoining flange plates, wherein the upper support plate is substantially rectangular in shape, wherein the flange plates adjoin the upper support plate along two opposing edges of the upper support plate, and wherein neither flange plate is parallel to the upper support plate.

10. The gaming machine assembly of claim 9, wherein the flange plates are configured to reflect light emanated from the lamp.

11. The gaming machine assembly of claim 9, wherein the flange plates are configured to diffuse light emanated from the lamp.

12. The gaming machine assembly as recited in claim 1, further including:

a locking assembly configured to be movable between a locked state and an unlocked state, wherein the locking assembly retains the illumination assembly within the docking assembly when the illumination assembly is docked with the docking assembly and the lock assembly is in the locked state, and wherein the locking assembly does not retain the illumination assembly within the docking assembly when the illumination assembly is docked with the docking assembly and the locking assembly is in the unlocked state.

13. The gaming machine assembly as recited in claim 12, wherein said docking assembly includes a docking frame defining said interior cavity, wherein said locking assembly includes a locking pin movable between a first position and a second position, the locking pin having a distal tip portion, the locking pin in the first position correlating with the locked state, the second position correlating with the unlocked state, wherein the distal tip portion extends into a receptacle included in the shield when the illumination assembly is docked in the docking assembly and the locking pin is in the first position, and wherein the distal tip portion does not extend into the receptacle included in the shield when the illumination assembly is docked in the docking assembly and the locking pin is in the second position.

14. The gaming machine assembly as recited in claim 13, wherein the locking assembly includes a biasing device that biases said locking pin towards the first position.

15. The gaming machine assembly as recited in claim 14, wherein the biasing device is a spring.

16. The gaming machine assembly as recited in claim 1, wherein the interior cavity is dimensioned to facilitate sliding receipt of the illumination assembly during docking.

17. The gaming machine assembly of claim 1, wherein the shield includes a hole feature dimensioned to facilitate insertion of a finger therethrough.

18. The gaming machine assembly of claim 1, wherein the interior cavity is substantially rectangular in cross-section.

19. The gaming machine assembly of claim 1, wherein the illumination assembly is connected to the gaming machine assembly with a cable.

20. A method of manufacturing a gaming machine assembly, the method comprising:

assembling a support frame, the support frame housing a master gaming controller and a memory;

attaching a top panel assembly supporting a display device to the support frame, the top panel assembly movably connected with the support frame and configured for movement between a closed position and an open position to enable access to the support frame; and installing an illumination assembly in the support frame, the illumination assembly including a shield and a lamp mounted to the shield; and mounting a docking assembly to the support frame, the docking assembly defining an interior cavity dimensioned for receipt of the illumination assembly, wherein the illumination assembly is configured to be removably docked with the docking assembly.

* * * * *